(12) United States Patent
Kosuda et al.

(10) Patent No.: US 9,720,791 B2
(45) Date of Patent: Aug. 1, 2017

(54) DEVICE, METHOD AND PROGRAM FOR PERFORMING SYSTEM TESTING

(71) Applicant: International Business Machines Corporation, Armonk, NY (US)

(72) Inventors: Masahiko Kosuda, Tokyo (JP); Toshio Nakamura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/840,269

(22) Filed: Aug. 31, 2015

(65) Prior Publication Data
US 2016/0092330 A1 Mar. 31, 2016

(30) Foreign Application Priority Data
Sep. 30, 2014 (JP) ................................ 2014-202063

(51) Int. Cl.
*G06F 11/00* (2006.01)
*G06F 11/22* (2006.01)
(Continued)

(52) U.S. Cl.
CPC ...... *G06F 11/2273* (2013.01); *G06F 11/2205* (2013.01); *G06F 11/263* (2013.01);
(Continued)

(58) Field of Classification Search
CPC .............. G06F 11/263; G06F 11/3414; G06F 11/3438; G06F 11/3457; G06F 11/3466;
(Continued)

(56) References Cited

U.S. PATENT DOCUMENTS

2009/0063751 A1* 3/2009 Dow ...................... G06F 12/08
711/6
2009/0300423 A1* 12/2009 Ferris ..................... G06F 11/36
714/38.1
(Continued)

FOREIGN PATENT DOCUMENTS

JP 2013254394 A 12/2013
JP 2014010581 A 1/2014
(Continued)

OTHER PUBLICATIONS

Decision to Grant a Patent, English Translation, Application No. 2014-202063, dated May 10, 2016, 3 pages.
(Continued)

*Primary Examiner* — Joseph D Manoskey
(74) *Attorney, Agent, or Firm* — Scott S. Dobson

(57) ABSTRACT

In an approach for testing the operations of a host system during a host system migration, a terminal agent exchanges messages already exchanged between the current host system and a terminal with the new host system. A manual operation replay unit replays messages generated by manual operations among the messages sent to the current host system by the terminal. An automatic response unit automatically generates a response message for messages received from the new host system. The automatic response unit also generates screen data for a screen displayed on the terminal on the basis of messages received from the new host system. A comparison unit compares and evaluates screen data generated by the automatic response unit and screen data from a screen generated by the terminal on the basis of messages received from the current host system.

5 Claims, 12 Drawing Sheets

(51) Int. Cl.
*G06F 11/263* (2006.01)
*G06F 11/34* (2006.01)

(52) U.S. Cl.
CPC ...... *G06F 11/3414* (2013.01); *G06F 11/3438* (2013.01); *G06F 11/3457* (2013.01); *G06F 11/3466* (2013.01); *G06F 2201/875* (2013.01)

(58) Field of Classification Search
CPC ............. G06F 11/0709; G06F 11/1402; G06F 11/2294; G06F 2201/875; G06F 11/2273; G06F 11/2205
USPC ................ 714/37, 25, 26, 30, 41, 47.1, 47.3
See application file for complete search history.

(56) References Cited

U.S. PATENT DOCUMENTS

| | | | | |
|---|---|---|---|---|
| 2012/0124074 | A1* | 5/2012 | Sharma | G06F 11/3672 707/769 |
| 2014/0146055 | A1* | 5/2014 | Bala | G06F 11/1402 345/501 |

FOREIGN PATENT DOCUMENTS

| | | |
|---|---|---|
| JP | 2014089619 A | 5/2014 |
| JP | 2014131212 A | 7/2014 |
| WO | 2007097014 | 8/2007 |

OTHER PUBLICATIONS

Notification of Reasons for Refusal, English Translation, Application No. 2014-202063, dated Mar. 22, 2016, 3 pages.
Kosuda et al., "Device, Method and Program for Performing System Testing", U.S. Appl. No. 15/247,968, filed Aug. 26, 2016.
List of IBM Patents or Patent Applications Treated as Related, dated Aug. 23, 2016, pp. 1-2.
"Workload Simulator for z/OS and OS/390", IBM, Printed on: May 21, 2015, pp. 1-2, <http://www-03.ibm.com/software/products/en/workloadsimulator>.
JP2014-202063, "Device, Method and Program for Performing System Testing", Filed on: Sep. 30, 2014, 44 pages.

\* cited by examiner

FIG. 2

```
! host_ip_address = 192.168.0.3

CONN 1410597309 647699 192.168.0.3 2014/09/13 17:35:09

01 KEYIN 80.145644000 340 18 2014/09/13 17:36:29
   00000000 007d5dc8 115dc383 8983a281        .....')H.)Ccicsa
   ffef                                       ..

02 KEYIN 94.141720000 381 29 2014/09/13 17:36:43
   00000000 027d4c7f 114be984 9585a3f2        .....'<..Zdnet2
   f5f6114c f9a28583 9985a3ff ef              56.<9secret..

03 KEYIN 99.868083000 386 17 2014/09/13 17:36:49
   00000000 037d40c4 115d5fd9 c3e3c4ff        .....' D.)`RCTD.
   ef                                         .

04 KEYIN 110.784713000 401 25 2014/09/13 17:37:00
   00000000 047d4f6f 114ae991 8195114f        .....'|?..Zjan.|
   e9918195 97a684ff ef                       Zjanpwd..

05 KEYIN 113.621612000 407 14 2014/09/13 17:37:03
   00000000 057dd47b 11d47bf1 ffef            .....'M#.M#1..

06 KEYIN 116.233712000 424 14 2014/09/13 17:37:05
   00000000 067dd4f9 11d4f8f1 ffef            .....'M9.M81..

07 KEYIN 119.851094000 450 10 2014/09/13 17:37:09
   00000000 07f34040 ffef                     .....3 ..

08 KEYIN 123.766244000 470 14 2014/09/13 17:37:13
   00000000 087dd4f9 11d4f8f2 ffef            .....'M9.M82..

09 KEYIN 127.375147000 480 16 2014/09/13 17:37:17
   00000000 097d4f6e 114f6bf1 f0f0ffef        .....'|>.|.100..

10 KEYIN 131.092411000 492 14 2014/09/13 17:37:20
   00000000 0a7dd4f9 11d4f8f1 ffef            .....'M9.M81..

11 KEYIN 177.069044000 571 10 2014/09/13 17:38:06
   00000000 0b7c4040 ffef                     .....@ ..
```

Reproduction Time: 2014-09-13_22-15-12
Key Input Location: Line 24 x Column 20 cicsa Enter Network Trace Time: 2014-09-13_17-36-29
Key Input Location: Line 24 x Column 20 cicsa Enter Reproduction Time: 2014-09-13_22-15-12
Key Input: F3

FIG. 8A

Network Trace Time: 2014-09-13_17-37-09
Key Input: F3

FIG. 8B

```
                Share Trading Demonstration              TRADER T004
             Share Trading Manager: Real-Time Quote User Name:    JAN Company Name:  Casey_Import_Export Share Values:              Commission Cost:
      NOW:       00079.00        for Selling:    007
      1 week ago: 00059.00       for Buying:     010
      6 days ago: 00063.00
      5 days ago: 00065.00
      4 days ago: 00070.00
      3 days ago: 00072.00
      2 days ago: 00078.00     Number of Shares Held: 0010
      1 day  ago: 00077.00     Value of Shares Held:  000000790.00

Request Completed OK

F3=Return                                                F12=Exit
MA  A                                                    01/001
```
Reproduction Time: 2014-09-13_22-16-49
Key Input: F3

FIG. 9A

```
                Share Trading Demonstration              TRADER T004
             Share Trading Manager: Real-Time Quote User Name:    JAN Company Name:  Casey_Import_Export Share Values:              Commission Cost:
      NOW:       00079.00        for Selling:    007
      1 week ago: 00059.00       for Buying:     010
      6 days ago: 00063.00
      5 days ago: 00065.00
      4 days ago: 00070.00
      3 days ago: 00072.00
      2 days ago: 00078.00     Number of Shares Held: 0100
      1 day  ago: 00077.00     Value of Shares Held:  000007900.00

Request Completed OK

F3=Return                                                F12=Exit
MA  A                                                    01/001
```
Network Trace Time: 2014-09-13_17-38-06
Key Input: F3

DEVICE, METHOD AND PROGRAM FOR PERFORMING SYSTEM TESTING

BACKGROUND

The present invention relates to a device, method, and program for running tests associated with a system migration.

When an information system migrates to another configuration, the migration sometimes includes a partial platform change, such as changes in hardware, operating system, and middleware, which is intended as few changes as possible to the application programs and data. This is known as "rehosting". When such a migration occurs in an information system, the information system has to be tested after the changeover to determine whether the application programs and data run on the information system as well as they did before the migration.

The evaluation method used in the migration test run on the information system sometimes entails testing by recording transmitted and received messages during processing performed by the information system as traces, and regenerating the operations of the information system on the basis of the recorded trace results. The test results are then evaluated. The testing tools used in such a test simulate terminals connected to a network and related messages in order to test the functions, stress, performance, and capacity of the information system.

SUMMARY

When communication occurs between a host and terminal in an information system, operations are performed to display the same screen on the terminal and to have the host receive the same input from the terminal. In this case, sometimes depending on the communication protocol being used the message exchanged between the host and the terminal does not have to be identical. Therefore, when performing a migration test on such an information system, it is necessary to keep in mind that the exchanged message may not be the same in the information system before and after the migration in operations displaying the same screen on the terminal and having the host receive the same input from the terminal.

In an information system migration in which the middleware implementation in the host and terminal remains unchanged, such as when the same platform is upgraded to a higher version, the message exchanged in the information system before and after the migration is the same during the operation performed to display the same screen on the terminal and have the host receive the same input from the terminal. Here, the testing can be performed on the basis of the trace results of processing in the information system using existing testing tools.

In a migration to an information system in which the middleware implementation between the devices has changed, such as when there has been a migration from a mainframe to an open system, the message exchanged in the information system before and after the migration is not the same during the operation performed to display the same screen on the terminal and have the host receive the same input from the terminal. As a result, the testing sometimes cannot be performed on the basis of the trace results of processing in the information system using existing testing tools.

It is an object of the present invention to enable a migration test to be run on the basis of trace results from communication in an information system even when different middleware has been installed in the information system before and after the migration.

In order to achieve this object, the present invention is realized as the following device. The device includes: a storage unit for holding files created by extracting messages generated by manual operations of a terminal among messages exchanged between the host system and the terminal prior to the migration; a sending and receiving control unit for performing an exchange of messages with the host system after the migration; a manual operation replay unit for replaying messages registered in files, and sending the replayed messages via the sending and receiving control unit to the host system after the migration; an automatic response message generating unit for automatically generating response messages for requests, and transmitting the generated messages via the sending and receiving control unit to the host system after the migration when messages received from the host system after the migration via the sending and receiving control unit are messages requesting a response; a screen data generating unit for generating screen data for a screen to be displayed on the display unit of a terminal on the basis of the messages received from the host system after the migration via the sending and receiving control unit; and a comparison unit for comparing the screen data generated by the screen data generating unit to the screen data generated by reproducing the operations of the terminal to determine whether or not there is a match. The manual operation replay unit sends a message to be sent after a predetermined amount of time has elapsed since other messages prior to the message have been sent, the predetermined amount of time being determined on the basis of the time at which a terminal sent the message corresponding to the message to be sent during an exchange between the host system and the terminal prior to the migration, and the time at which a message replayed by manual operations just prior to sending the message was sent. The sending and receiving control unit sends the messages reproduced by the manual operation replay unit after the messages generated by the automatic response generating unit have been sent when messages generated by the manual operation replay unit and messages generated by the automatic response message generating unit are to be sent for messages received from the host system after the changeover.

The present invention is also realized as the following method. This method includes the steps of: having the server test the operations of the host system after the migration perform an exchange of messages with the host system after the migration; generating screen data for a screen to be displayed on the display unit of a terminal on the basis of the messages received from the host system after the migration; and comparing the screen data generated on the basis of messages received from the host system after the migration to screen data generated by replaying reproducing the operations of the terminal on the basis of massages exchanged with the host system prior to the migration to determine whether or not there is a match; the step of exchanging messages further comprising the steps of: retrieving and replaying messages from files created by extracting messages generated by manual operation of the terminal among the messages exchanged between host system and the terminal prior to the migration, and sending the replayed messages to the host system after the migration; and automatically generating response messages for requests when the messages received from the host system after the migration are messages requesting a response, and sending the generated messages to the host system after the migration.

The present invention may also be realized as a program able to control a computer so as to perform each of the functions of the device described above, or as a program able to execute in a computer each of the steps in the method described above. This program may be stored and distributed on a magnetic disk, optical disk, semiconductor memory or some other recording medium, or may be distributed via a network.

The present invention enables a changeover test to be run on the basis of network trace results in an information system even when different middleware has been installed in the information system before and after the changeover.

BRIEF DESCRIPTION OF THE DRAWINGS

FIG. 2 is a diagram showing an example of a configuration for a message file, in accordance with an embodiment of the present invention.

FIG. 4 is a diagram showing an example of a configuration for a scenario file, in accordance with an embodiment of the present invention.

FIG. 7A is a diagram showing a screen based on screen data written to a testing screen buffer, and FIG. 7B is a diagram showing a screen based on screen data written to a reference screen buffer, in accordance with an embodiment of the present invention.

FIGS. 8A and 8B are a pair of diagrams showing screens based on screen data included in the message in Sequence No. 25 of the message file in FIG. 2, where FIG. 8A is a diagram showing a screen based on screen data written to a testing screen buffer, and FIG. 8B is a diagram showing a screen based on screen data written to a reference screen buffer, in accordance with an embodiment of the present invention.

FIGS. 9A and 9B are a pair of diagrams showing screens based on screen data included in the message in Sequence No. 33 of the message file in FIG. 2, where FIG. 9A is a diagram showing a screen based on screen data written to a testing screen buffer, and FIG. 9B is a diagram showing a screen based on screen data written to a reference screen buffer, in accordance with an embodiment of the present invention.

FIG. 10 is a diagram showing the screen data from the screen in FIG. 9A, in accordance with an embodiment of the present invention.

FIG. 11 is a diagram showing the screen data from the screen in FIG. 9B, in accordance with an embodiment of the present invention.

DETAILED DESCRIPTION

The following is a detailed explanation of an embodiment of the present invention with reference to the appended drawings.

Figure 1:
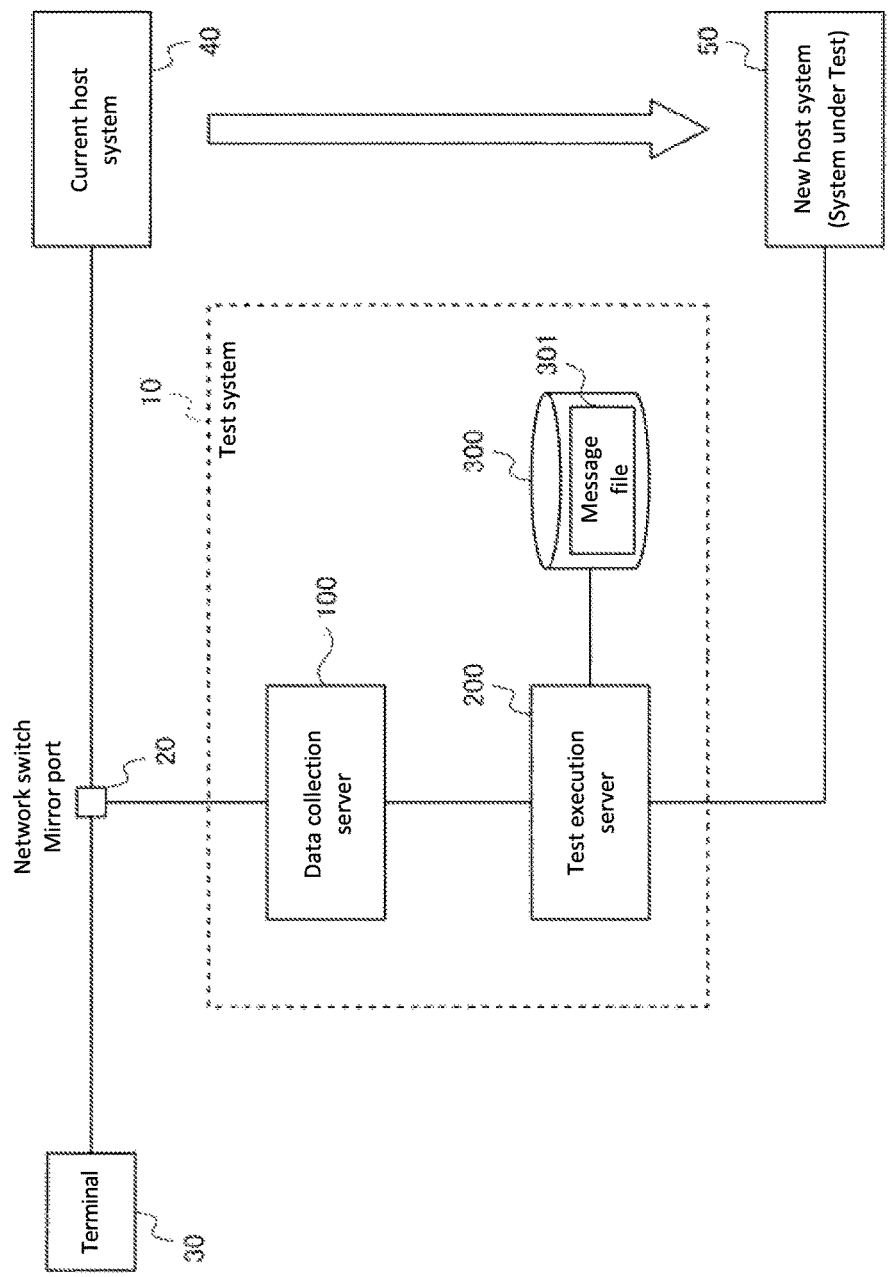
FIG. 1 is a diagram showing an example of a configuration for a test system in which the present embodiment is applied.

FIG. 1 is a diagram showing an example of a configuration for a test system in which the present embodiment can be applied. The test system 10 shown in FIG. 1 runs a migration test when the current host system 40 constituting the current information system is migrated to the new host system 50 to be used in the new information system. In other words, the test system 10 in the present embodiment executes a test to determine whether the new host system 50 after the migration operates in the same manner as the current host system 40 prior to the migration. The information system to be verified in the present embodiment is a system led by the host system for exchanging messages between the host system (current host system 40, new host system 50) and terminal(s) 30. In the present embodiment, the information system to be verified has a character-based user interface (CUI). In other words, the interface screen displayed on the display unit of a terminal 30 is a character-based screen based on a message from the host system (current host system 40, new host system 50).

The test system 10 captures data (network data) exchanged between a terminal 30 and the current host system 40 using a network switch mirror port 20 provided in a line connecting the terminal 30 to the current host system 40. The test system 10 then simulates the operations of the terminal 30 and captures data exchanged with the new host system 50 to be verified. The information related to the captured data exchanged with the current host system 40 is compared to the information related to the data exchanged with the new host system 50 to enable the operations of the new host system 50 to be verified.

As shown in FIG. 1, the test system 10 in the present embodiment includes a data collection server 100 for receiving network data sent from the mirror port 20, and a test execution server 200 for processing network data received from the data collection server 100 and running a test against the new host system 50.

The data collection server 100 captures (traces) the network data exchanged between the terminal 30 and the current host system 40 via a mirror port 20, and sends the data to the test running server 200. When the test execution server 200 receives network data from the data collection server 100, it creates a message file 301 in which the messages exchanged between the terminal 30 and the current host system 40 included in the captured network data are registered. A message file 301 is created for each terminal 30 that has exchanged messages with the current host system 40. The created message files 301, as shown in FIG. 1, may be stored in an external storage device 300 of the test execution server 200 or may be stored in a storage device (not shown) installed inside the test execution server 200.

Here, the messages sent from a terminal 30 to the current host system 40 are messages generated by operations performed by the operator on the terminal 30 (referred to below as manual operations), and messages generated by the terminal 30 as an automatic response to a request from the current host system 40. The content inputted by the operator into the information system remains unchanged before and after the information system migration. Therefore, among the messages included in the message file 301, the messages generated by a manual operation may simply be replayed without any changes when the operations of the new host system 50 are tested.

Messages sent as a request to the terminal 30 from the new host system 50 and messages generated by the terminal 30 as an automatic response to the request may include the same request and response context, but the messages themselves are not the same as those exchanged between the current host system 40 and the terminal 30. This is because the middleware installed in the current host system 40 and the new host system 50 is different. If the request in a message sent from the host system to the terminal 30 is different, the message sent as an automatic response from the terminal 30 is also different. Next, in messages sent from the new host system 50 to the terminal 30 to be displayed on the user interface screen (UI interface screen), it is not necessary to send all of the characters constituting the UI screen every time a screen is sent. In a character-based UI screen, a plurality of fields are combined. When UI screen data is sent, the position of each field on the screen is indicated so that the order in which information for each field is sent does not have to be fixed. Therefore, messages sending the same display screen may not be the same before and after a host system migration. In the present embodiment, requests are received by the test execution server 200 from the new host system 50 related to messages generated on the basis of an automatic response, and the operations of a terminal 30 are simulated to generate an actual message on the basis of an automatic response.

Because messages from the new host system 50 and messages generated by an automatic response are not the same as the messages exchanged by the current host system 40 and the terminal 30, it cannot be determined whether or not the operations of the new host system 50 are consistent with the operations of the current host system 40 when the messages are compared to each other. In the present embodiment, a screen displayed on the display unit of the terminal 30 as a result of an exchange of messages between the current host system 40 and the terminal 30 is compared to a screen generate as a result of an exchange of messages between the new host system 50 and a test execution server 200 (simulating terminal 30) to determine whether or not the operations of the new host system 50 are consistent with the operations of the current host system 40.

In the example shown in FIG. 1, the test execution server 200 creates the message files 301. However the present invention is not restricted to the configuration shown here. For example, the data collection server 100 may create the message files 301.

Figure 2:
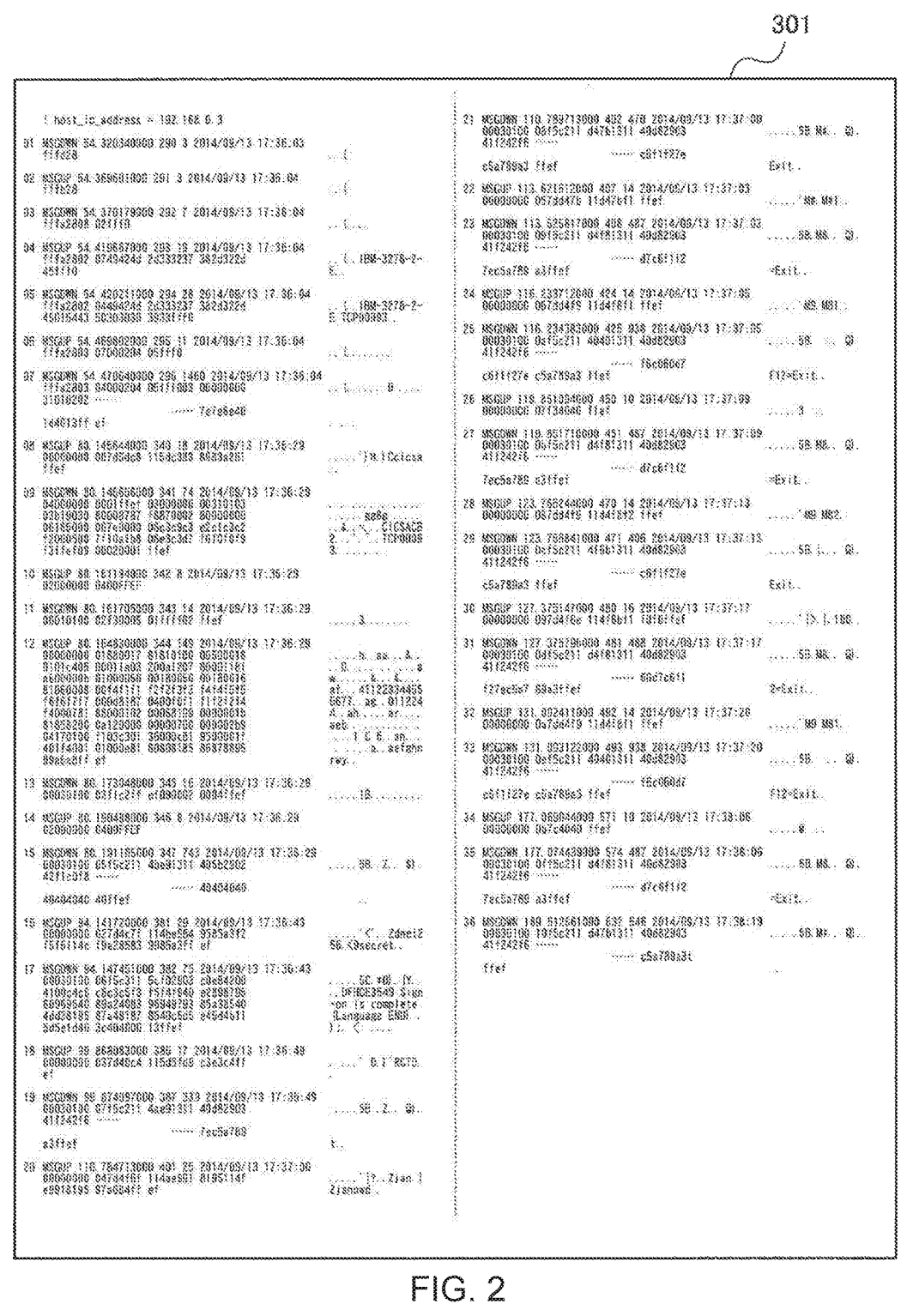

FIG. 2 is a diagram showing an example of a configuration for a message file 301. In the example shown in FIG. 2, 36 messages exchanged between the current host system 40 and a terminal 30 are recorded in the message file 301 from Sequence No. 01 to Sequence No. 36. In the example shown in FIG. 2, some of the data in the messages containing a large amount of data (the messages in Sequences No. 07, 15, 19, 21, 23, 25, 27, 29, 31, 33, 35, and 36) has been partially omitted and compressed.

In the message file 301 shown in FIG. 2, the messages including "MSGDWN" in the first line (the messages in Sequences No. 01, 03, 05, etc.) are messages sent from the current host system 40 to the terminal 30. Also, the messages including "MSGUP" in the first line (the messages in Sequences No. 02, 04, 06, etc.) are messages sent from the terminal 30 to the current host system 40. The time at which the message was exchanged (traced) between the terminal 30 and current host system 40 is recorded in the first line of each message. For example, the message in Sequence No. 01 is a message sent from the current host system 40 to the terminal 30 at "2014 Sep. 13 17:36:03". Similarly, the message in Sequence No. 02 is a message sent from the terminal 30 to the current host system 40 at "2014 Sep. 13 17:36:04".

Figure 3:
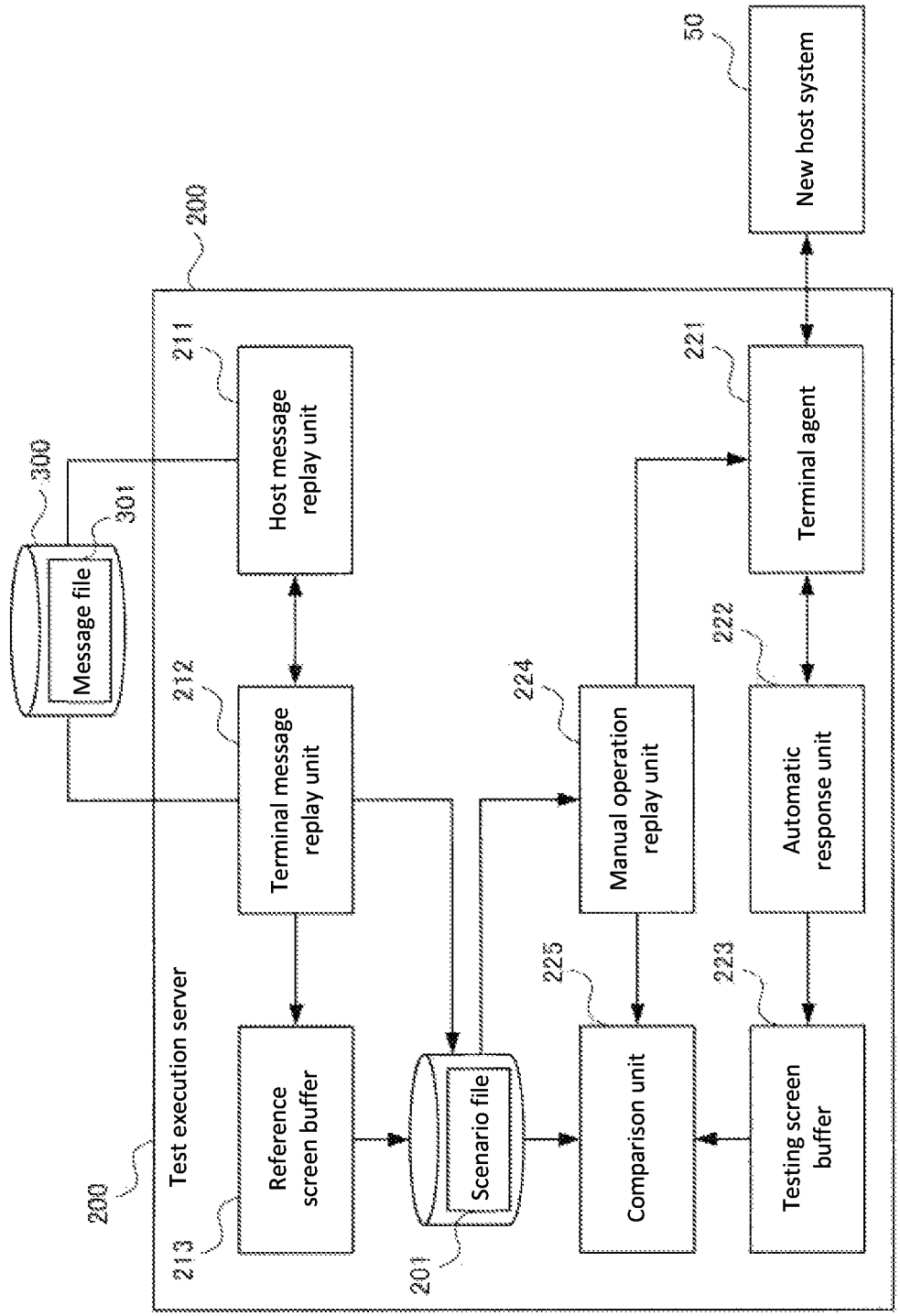
FIG. 3 is a diagram showing an example of a function configuration for a test execution server, in accordance with an embodiment of the present invention.

FIG. 3 is a diagram showing an example of a function configuration for a test execution server 200. As shown in FIG. 3, the test execution server 200 of the present embodiment includes a host message replay unit 211, a terminal message replay unit 212, and a reference screen buffer 213 for reproducing the operations of the terminal 30 and the current host system 40 to enable comparison in the test. The test execution server 200 also includes a terminal agent 221, automatic response unit 222, testing screen buffer 223, manual operation replay unit 224, and comparison unit 225 for testing the operations of the new host system 50.

The host message replay unit 211 and the terminal message replay unit 212 each retrieve message files 301, and replay communication between the current host system 40 and the terminal 30 in the actual transmission sequence.

The host message replay unit 211 has a function for simulating the send and receive operations of the current host system 40. Here, the host message replay unit 211 takes recorded messages sent from the current host system 40 to the terminal 30 in the message file 301 and sends them to the terminal message replay unit 212, and messages sent from the terminal 30 to the current host system 40 are received from the terminal message replay unit 212.

The terminal message replay unit 212 has a send-and-receive function and a screen-generating function which simulates the operations of the terminal 30. Functions unique to the terminal message replay unit 212 which terminals 30 do not possess include a message identifying function and a scenario file creating function. The functions of the terminal message replay unit 212 used to simulate the operations of a terminal 30 may be realized using an existing terminal emulator.

The terminal message replay unit 212 uses the send-and-receive function on messages recorded in the message file 301 to receive them from the host message replay unit 211 which were sent from the current host system 40 to the terminal 30, and to send the messages to the host message replay unit 211 which were sent from the terminal 30 to the current host system 40.

The terminal message replay unit 212 uses the screen-generating function to write data for a screen (referred to below as screen data) based on messages received from the host message replay unit 211 to the reference screen buffer 213 in accordance with the definition of the data stream in the communication protocol between the terminal message replay unit 212 and the host message replay unit 211 (that is, between the terminal 30 and the current host system 40). In other words, the terminal message replay unit 212 functions as a simulated screen data generating unit which simulates screen data for a screen displayed on the display unit of the terminal 30 based on messages received from the current host system 40.

The terminal message replay unit 212 uses the message-identifying function to determine whether or not each of the messages sent to the host message replay unit 211 was generated by a keyboard (keystroke) operation performed by the operator of the terminal 30. As mentioned above, in the present invention, messages generated by a manual operation performed on the terminal 30 are differentiated from messages generated on the basis of an automatic response from the terminal 30. This message differentiating method will be explained below.

The terminal message replay unit 212 uses the scenario file creating function to write messages determined by the message-identifying function to be generated by a manual operation to a scenario file 201. In other words, the terminal message replay unit 212 functions as a file creating unit which creates scenario files 201 based on replayed messages. The terminal message replay unit 212 extracts the manually inputted characters and command information in the message and records them in the scenario file 201. The time at which each message, including messages generated by an automatic response, was acquired (as recorded in the message file 301) is also recorded in the scenario file 201. The created scenario file 201 is held in a memory unit such as the memory of the test execution server 200 or a magnetic disk. When the operations of the new host system 50 are tested, this is used to replay the manual operations performed on the terminal 30. Here, the terminal message replay unit 212 writes screen data to the scenario file 201. However, a separate screen data file can be created and managed screen data independently.

The terminal message replay unit 212 identifies the field relating manual input (key input) from field information on the UI screen included in the message generated by the manual operation. The terminal message replay unit 212 uses the description of the identified field to extract the position of the field receiving the key input, the type of inputted keys (inputted content), and the position of the cursor on the screen, and records this information in the scenario file 201. During the verification process, this is used to clarify what key input has been performed in each field of the UI screen. As in the case of screen data management, the terminal message replay unit 212 may record and store information extracted from the message in a file other than a scenario file 201. The method used to identify fields with key input and extract information related to the key input from a message will be described in greater detail below.

The reference screen buffer 213 holds screen data extracted from messages by the terminal message replay unit 212. Some terminal emulators, which reproduces the functions of a terminal 30 by software, have a screen buffer used when a screen displayed on the terminal 30 is generated. When the terminal message replay unit 212 is realized by a terminal emulator and the terminal emulator possesses a screen buffer function, the reference screen buffer 213 may be realized using the screen buffer function of the terminal emulator. The screen data held by the reference screen buffer 213 will be compared later to screen data generated in an operational test of the new host system 50 as explained below.

The terminal agent 221 is connected to the new host system 50 to be verified, and communication exchanged between the terminal 30 and the current host system 40 is replayed with the new host system 50. In other words, the terminal agent 221 functions as a send-and-receive control unit which receives messages sent from the new host system 50 and forwards them to the automatic response unit 222. The terminal agent 221 sends to the new host system 50 both messages generated by manual operations and messages generated automatically in response to requests from the new host system 50. When messages are sent from the terminal agent 221 to the new host system 50, message integrity and timing have to be controlled appropriately. The specific operations performed during message transmission are explained below.

The automatic response unit 222 writes screen data based on messages received from the new host system 50 via the terminal agent 221 to the test screen buffer 223 according to the definition of the data stream in the communication protocol used by the terminal agent 221 and the new host system 50. The automatic response unit 222 generates response messages to requests and sends them to the terminal agent 221 when a received message includes a response request. As mentioned above, response messages are sent from the terminal agent 221 to the new host system 50. In other words, the automatic response unit 222 functions as a screen data generating unit for generating screen data for screens displayed on the display unit of the terminal 30 based on messages received from the new host system 50, and as a response message automatic generating unit for processing requests in messages received from the new host system 50 and automatically generating a response message.

The test screen buffer 223 holds screen data extracted from a message by the automatic response unit 222. The screen data held in the test screen buffer 223 is compared to screen data written to a scenario file 201 or some other management file by the terminal message replay unit 212. The terminal agent 221, automatic response unit 222, and test screen buffer 223 may be realized by an existing terminal emulator in the same manner as the terminal message replay unit 212 and the reference screen buffer 213.

The manual operation replay unit 224 replays messages generated by manual operations performed on the terminal 30 among the messages exchanged between the terminal 30 and the current host system 40 in a scenario file 201 created by the terminal message replay unit 212. The manual operation replay unit 224 sends reproduced messages to the new host system 50 via the terminal agent 221 at the appropriate time. The timing for sending messages generated by manual operations will be explained below in greater detail.

The comparison unit 225 compares the screen data recorded in the scenario file 201 from the terminal message replaying unit 212 or another management file to the screen data held in the test screen buffer 223 to determine whether there is a match, and outputs the results. The outputted results are held by a memory unit such as the memory in the test execution server 200 or in an external memory device.

The following is an explanation of the scenario file configuration. FIG. 4 is a diagram, showing an example of a configuration for a scenario file 201. In the example shown in FIG. 4, screen data generated by the terminal message replay unit 212 is not recorded in the scenario file 201. Only messages generated by manual operations are recorded in the scenario file 201. The screen data is written to and stored in another file.

In the example shown in FIG. 4, eleven messages generated by manual operations performed on a terminal 30 are recorded in the scenario file 201 in Sequence No. 01 to Sequence No. 11. Each message in Sequence Nos. 01 through 11 in the scenario file 201 corresponds to one of the messages in the message file 301 in Sequence Nos. 08, 16, 18, 20, 22, 24, 26, 28, 30, 32, and 34.

In order to create a scenario file 201, as mentioned above, the messages recorded in the message file 301 that were generated by a manual operation have to be identified. In the present embodiment, the messages generated by a manual operation are identified by determining whether or not there is information indicating a particular key input at a certain location in the message.

In addition to keys used to enter characters, the keys of the keyboard also include key which send messages when pressed (for example, the "Enter" key or a function key; referred to below as the AID key). Messages exchanged by a terminal 30 and the current host system 40 are also written in a format defined by the communication protocol. Therefore, if the AID key is written at a certain location in the message based on the message format, the message was sent by pressing the AID key (and generated by a keyboard operation). Also, depending on the communication protocol and on the basis of the particular format, conditions are established to identify messages generated by a manual operation and messages generated on the basis of an automatic response. These types of messages can be identified on the basis of these conditions.

In the example of a message file 301 shown in FIG. 2 and a scenario file 201 shown in FIG. 4, messages are exchanged on the basis of, for example, the IBM 3270 protocol. Therefore, the focus will be on the value in the sixth byte of the data portion of the second and subsequent lines of the message. For example, in the message in Sequence No. 01 of the scenario file 201 (and in Sequence No. 08 in the message file 301), the value of the sixth byte is "7d". The value represents the "Enter" key, which is an AID key. Therefore, this message is identified as a message that was generated by a manual operation. In the message in Sequence No. 07 of the scenario file 201 (and Sequence No. 26 in the message file 301), the value of the sixth byte is "f3". This value represents a function key (the "F3" key), which is an AID key. Therefore, this message is identified as a message that was generated by a manual operation.

In the process for creating a scenario file 201, the terminal message replaying unit 212 identifies fields in which key input has occurred in messages to be recorded in the scenario file 201, and the information related to the key input is extracted and recorded in the scenario file 201. The messages to be recorded in the scenario file 201 are messages recorded in the message file 301 which have been generated by a manual operation performed on a terminal 30 and sent from the terminal 30 to the current host system 40 (referred to below as sent messages). These sent messages include information in fields other than the fields in which key input occurred. Therefore, fields in which key input occurred cannot be identified by using only the content of the sent message.

In the present embodiment, the fields in which key input occurred are identified by contrasting the screen data written to the reference screen buffer 213 by the terminal message replay unit 212 with the sent messages. More specifically, the terminal message replay unit 212 first receives screen data from the host message replay unit 211, and then selects the initial message sent to the host message replay unit 211. Next, the terminal message replay unit 212 identifies the fields in the screen data corresponding to each field described in the selected sent message, and then compares the data in each corresponding field. If the data in the corresponding fields of the screen data and sent message is different, the data in the field was entered by a manual operation after the screen was displayed.

In this example, a message in the scenario file 201 shown in FIG. 4 are referenced. Because this message is based on, for example, the IBM 3270 protocol, the value of the sixth byte indicates the type of AID key that was entered, and the values in the seventh and eighth bytes indicate the position of the cursor. The portion after value "11" indicates the information in the field. More specifically, the value of the two bytes immediately following value "11" indicate the position of the field, and the values of indefinite length following these values indicate the data recorded in the field.

For example, in the message in Sequence No. 01 in the scenario file 201, the type of AID key that was inputted is "7d", and the position of the cursor is "5dc8". There is one described field. The position of the field is "5dc3", and the data recorded in the field is "838983a281". The data recorded in the field continues until the next "11" value or "ffef" value (the value indicating the end of a message in TELNET). By repeatedly inputting "11" values, field positions, and data sets, the information in a plurality of fields can be included in the message.

When a field in which key input occurred has been identified in this way, the terminal message replay unit 212 records the AID key, the cursor position, the position of the field in which key input occurred, and the input content in a scenario file 201 or some other management file.

In an information system, many terminals (on the order of tens of thousands of terminals) are often simultaneously connected to the host and performing operations. In these cases, when the communication load between the host system and each terminal is taken into account, the time interval at which each message was exchanged should be reproduced when testing the operations of the information system after the migration. In the present invention, the timing at which messages generated by manual operations were sent is controlled on the basis of the times at which each message recorded in the scenario file 201 was captured (the time recorded in the message file 301).

More specifically, when a message is to be sent, the manual operation replay unit 224 sends the message after a predetermined amount of time has elapsed since the previous message was sent. This amount of time is determined on the basis of the time registered in the scenario file 201. In other words, the manual operation replaying unit 224 first determines the difference between the time at which the message corresponding to the previously sent message was captured and the time at which the message corresponding to the message to be sent next as registered in the scenario file 201. The manual operation replay unit 224 sends the next message once a period of time corresponding to the determined difference has elapsed after the previous message was sent (provided the time conditions are satisfied). In other words, in the present embodiment, time conditions are established for determining the timing for sending each message using amounts of time determined on the basis of the time at which each message recorded in the scenario file 201 was captured.

In the following explanation, the messages in Sequence No. 01 and Sequence No. 02 in the scenario file 201 shown in FIG. 4 will be used as reference examples. The send time of the message in Sequence No. 01 is "17:36:29", and the send time of the message in Sequence No. 02 is "17:36:43". Therefore, the manual operation replay unit 224 uses the difference to set the timing (time condition) for sending the message corresponding to the message in Sequence No. 02 at fourteen seconds after sending the message corresponding to the message in Sequence No. 01.

The time condition for sending the message corresponding to the message in Sequence No. 01 recorded at the beginning of the scenario file 201 is established based on the difference between the time at which the message corresponding to the message in Sequence No. 01 was captured and the time at which the terminal 30 connected to the current host system 40. The time at which the terminal 30 connected to the current host system 40 is recorded in the second line "CONN141059~" in the scenario file 201 shown in FIG. 4 as "17:35:09". Therefore, the manual operation replay unit 224 establishes the timing for sending the message corresponding to the message in Sequence No. 02 at 1 minute, 20 seconds after the test execution server 200 (terminal agent 221) connects to the new host system 50.

When a message is to be sent, the manual operation replay unit 224 also determines whether the previous processing (that is, the processing up through the writing of the previous screen data) has been completed for the exchange of messages with the new host system 50. When the previous processing has been completed, the message is sent. This is because key strokes are entered in the terminal 30 after the screen in which the input operation to be performed has been displayed on the display unit of the terminal 30.

In order to verify whether the previous processing has been completed once the timing for sending the message has been determined, the manual operation replay unit 224 of the present embodiment compares the screen data held in the test screen buffer 223 with the screen data held in the reference screen buffer 213 when the message was written to the scenario file 201. Because the screen data held in the reference screen buffer 213 was written to the scenario file 201 or another management file, the comparison may be performed using the screen data written to the file.

When the content of the screen data in both buffers matches, the previous processing performed by the information system to be verified including the new host system 50 has been completed, and the manual operation replay unit 224 sends the message. When the content of the screen data in both buffers does not match, the previous processing has not been completed. Therefore, the writing of the next screen data to the test screen buffer 223 is awaited, and the new screen data is compared after it has been written. When the content of the screen data in both buffers continues to not match, the device remains in standby until a message generated by a manual operation has been sent. This effectively stops the test of the information system to be verified which includes the new host system. If an upper limit has been set for the standby time and the set time has been reached, error processing such as notifying the operator that an error has occurred can be configured, and operations can be suspended or continued.

Figure 5:
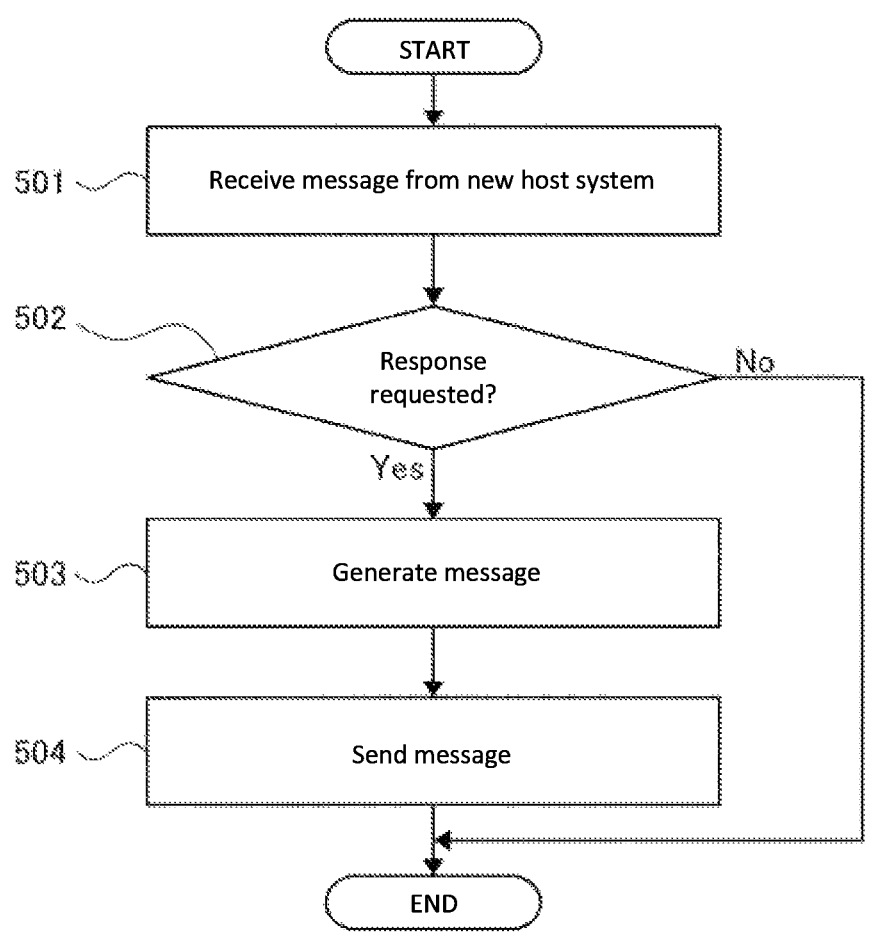
FIG. 5 is a flowchart showing the message transmission process based on an automatic response, in accordance with an embodiment of the present invention.
Figure 6:
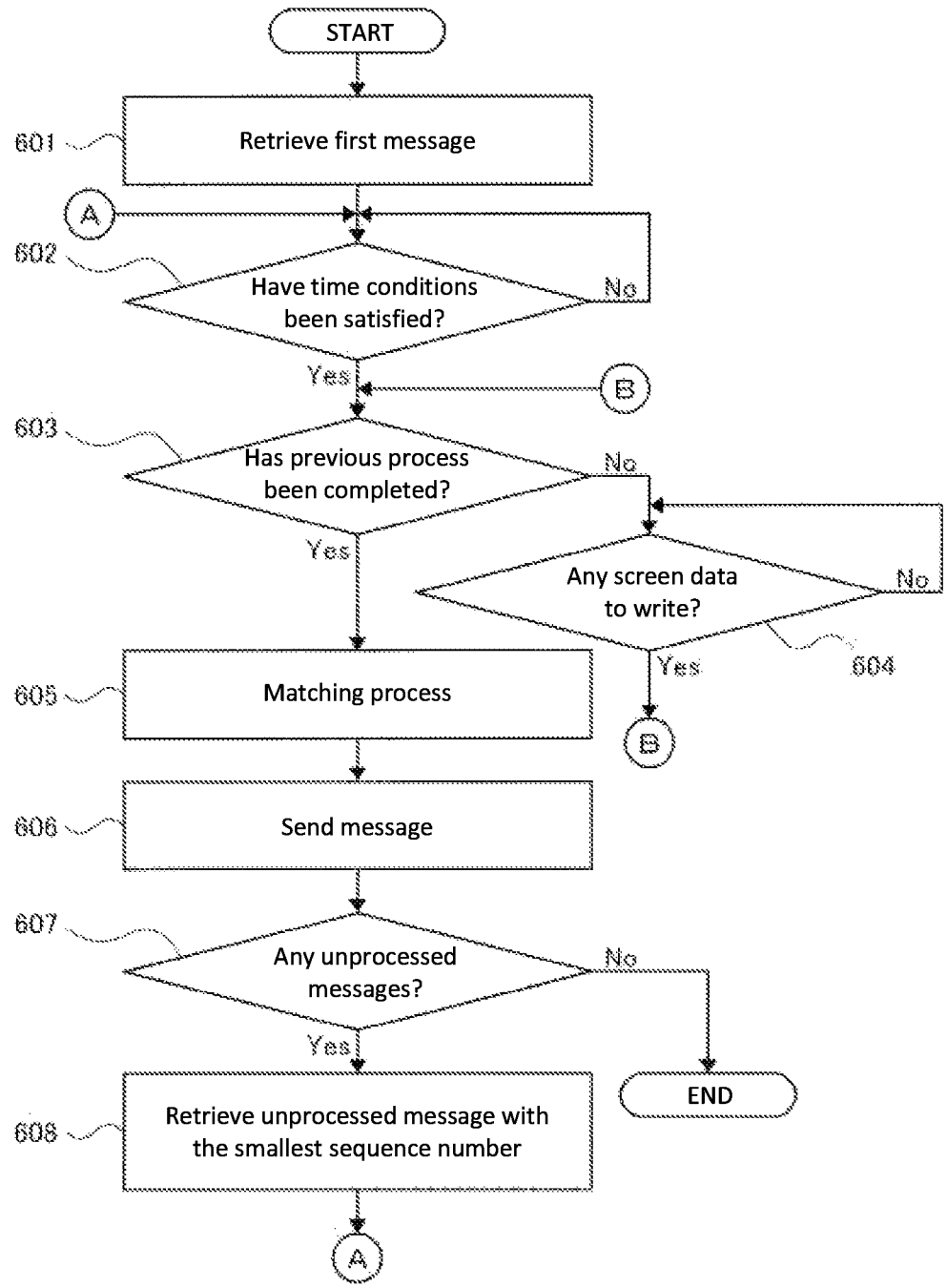
FIG. 6 is a flowchart showing the message transmission process based on a manual operation, in accordance with an embodiment of the present invention.

The following is an explanation of the processing flow that is performed when messages are sent from the test execution server 200 to the new host system 50. FIG. 5 is a flowchart showing the message sending process based on an automatic response. FIG. 6 is a flowchart showing the message sending process based on a manual operation. In the present embodiment, the terminal agent 221 of the test execution server 200 sends to the new host system 50 messages based on an automatic response generated by the automatic response unit 222, and messages based on a manual operation replayed by the manual operation replay unit 224 on the basis of the scenario file 201.

When a message generated by an automatic response is to be sent, as shown in FIG. 5, the terminal agent 221 first receives a message from the new host system 50 (Step 501). When the received message is a message requesting a response (Step 502, yes branch), the automatic response unit 222 generates a response message (Steps 503), and immediately sends the message generated by the terminal agent 221 to the new host system 50 (Step 504). When the received message is not a message requesting a response (Step 502, no branch), the message sending process ends.

When the test execution server 200 (terminal agent 221) is connected to the new host system 50, the automatic response unit 222 sends terminal information (terminal name, screen size, etc.) in an automatic response as a reply to an inquiry from the new host system 50. This information has been extracted from the message exchanged by the terminal 30 and the current host system 40, has been written to the scenario file 201 or some other management file, and is set in the automatic response unit 222. This information may be set in the terminal agent 221, and the terminal agent 221 may overwrite the terminal information in responses from the automatic response unit 222.

When a message generated by a manual operation is sent, as shown in FIG. 6, the manual operation replay unit 224 reads a first, or initial, message recorded in the scenario file 201 (Step 601). Next, the manual operation replay unit 224 determines whether or not the time conditions for sending the read message have been satisfied (Step 602). Here, the time conditions for sending the message are time conditions determined on the basis of the time recorded in the scenario file 201.

When the time conditions have been satisfied (Step 602, yes branch), the manual operation replay unit 224 determines whether or not the previous processing has been completed in the information system including the new host system 50 and the test execution server 200 (Step 603). As mentioned above, this is determined by comparing the screen data held in the test screen buffer 223 to the screen data obtained from the scenario file 201 which was held in the reference screen buffer 213.

When the previous processing has not been completed (Step 603, no branch), the manual operation replay unit 224 waits for the next writing of screen data to the test screen buffer 223 (Step 604). After the next writing of screen data has been completed (Step 604, yes branch), it determines whether or not the previous processing has been completed (Step 603).

When the previous processing has been completed (Step 603, yes branch), the manual operation replay unit 224 sends the message read in Step 601 to the terminal agent 221. The terminal agent 221 checks the integrity of the message received from the manual operation replay unit 224 against the sent message (Step 605), and sends the message received from the manual operation replay unit 224 to the new host system 50 (Step 606). This integrity processing includes checking the sequence numbers of each message and checking the compliance with the format demanded of the communication protocol. When the message received previously from the new host system 50 is a message requesting a response, and both a message generated by a manual operation and a message generated by an automatic response are to be sent, the message generated by a manual operation is sent after the message generated by the automatic response unit 222 has been sent (the message generated by an automatic response).

Next, the manual operation replay unit 224 determines whether or not there are any unprocessed messages in the scenario file 201, and if there are unprocessed messages (Step 607, yes branch), retrieves the unprocessed message with the smallest sequence number (Steps 608). The manual operation replay unit 224 then repeats the process beginning with Step 602. When all messages in the scenario file 201 have been processed (Step 607, no branch), the process of sending messages generated by manual operations on the basis of the scenario file 201 is ended (Step 607).

In this way, a test is performed on the operations of the new host system 50 including messages sent on the basis of a single scenario file 201. Because a scenario file 201 is created for each terminal 30 connected to the current host system 40 in the current information system, the test execution server 200 in the present embodiment performs the same test of the new host system 50 using the scenario files 201 corresponding to each terminal 30.

The following is an explanation, with reference to FIG. 7 through FIG. 9, of examples of test runs performed by comparing a screen based on screen data written to a reference screen buffer 213 to a screen based on screen data written to a test screen buffer 223. In the examples explained below, screens based on messages recorded in the message file 301 shown in FIG. 2 are compared. These include a screen based on screen data exchanged by the message in Sequence No. 07, a screen based on screen data exchanged by the message in Sequence No. 25, and a screen based on screen data exchanged by the message in Sequence No. 33.

Figure 7A:
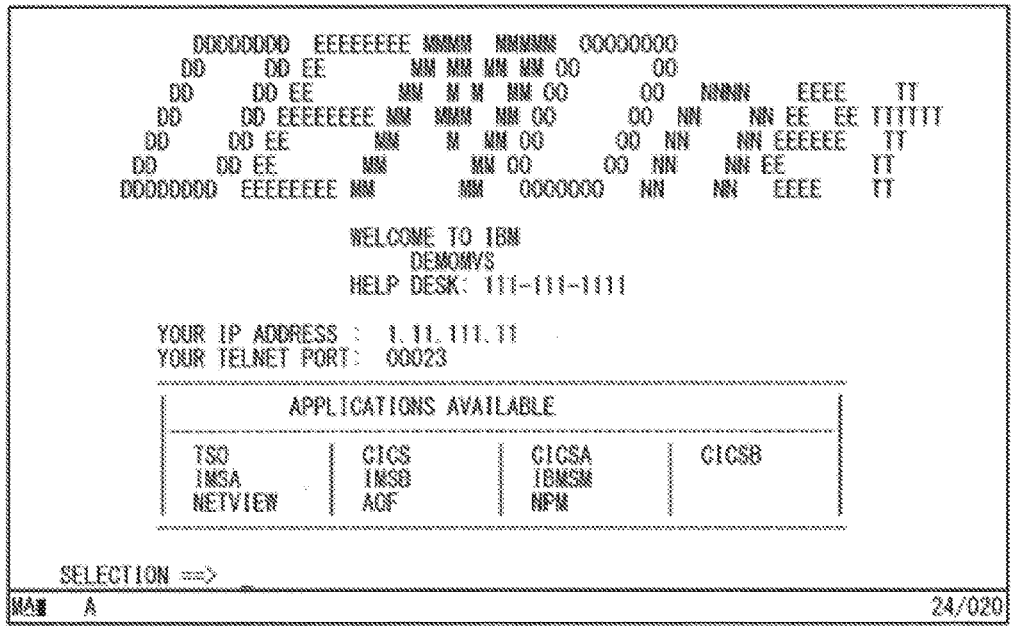
FIGS. 7A and 7B are a pair of diagrams showing screens based on screen data included in the message in Sequence No. 07 of the message file in FIG. 2, where
Figure 7B:
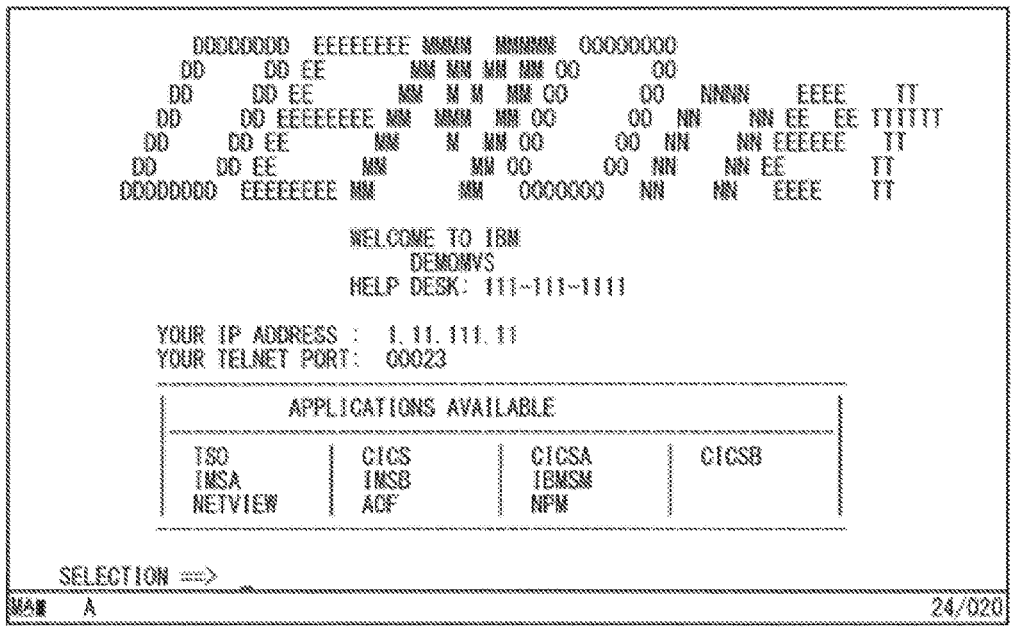

FIG. 7 is a pair of diagrams showing screens based on screen data included in the message in Sequence No. 07 of the message file 301 shown in FIG. 2. FIG. 7A is a diagram showing a screen based on screen data written to the test screen buffer 223, and FIG. 7B is a diagram showing a screen based on screen data written to the reference screen buffer 213. When the screen in FIG. 7A and the screen in FIG. 7B are compared, they are exactly the same. This means the processing related to the screen has been processed by the new host system 50 in the same way as the current host system 40.

The "replay time" shown in FIG. 7A is the time at which the message is replayed by the manual operation replay unit 224 based on the manual operation performed in screen FIG. 7A. The "key input" in the manual operation replayed by the manual operation replay unit 224 is the input of the character string "cicsa" at position "row 24, column 20" on the screen, followed by hitting the "Enter" key. This content is the same as the "key input" content in FIG. 7B described below. This input content is replayed by the manual operation replay unit 224 on the basis of the message in Sequence No. 01 of the scenario file 201 shown in FIG. 4.

The "network trace time" shown in FIG. 7B is the time traced for the message including the screen data of the screen in FIG. 7B and recorded in message file 301. The "key input" in the manual operation actually performed on the screen displayed on the terminal 30 is the input of the character string "cicsa" at position "row 24, column 20" on the screen, followed by hitting the "Enter" key.

Figures 8A, 8B:
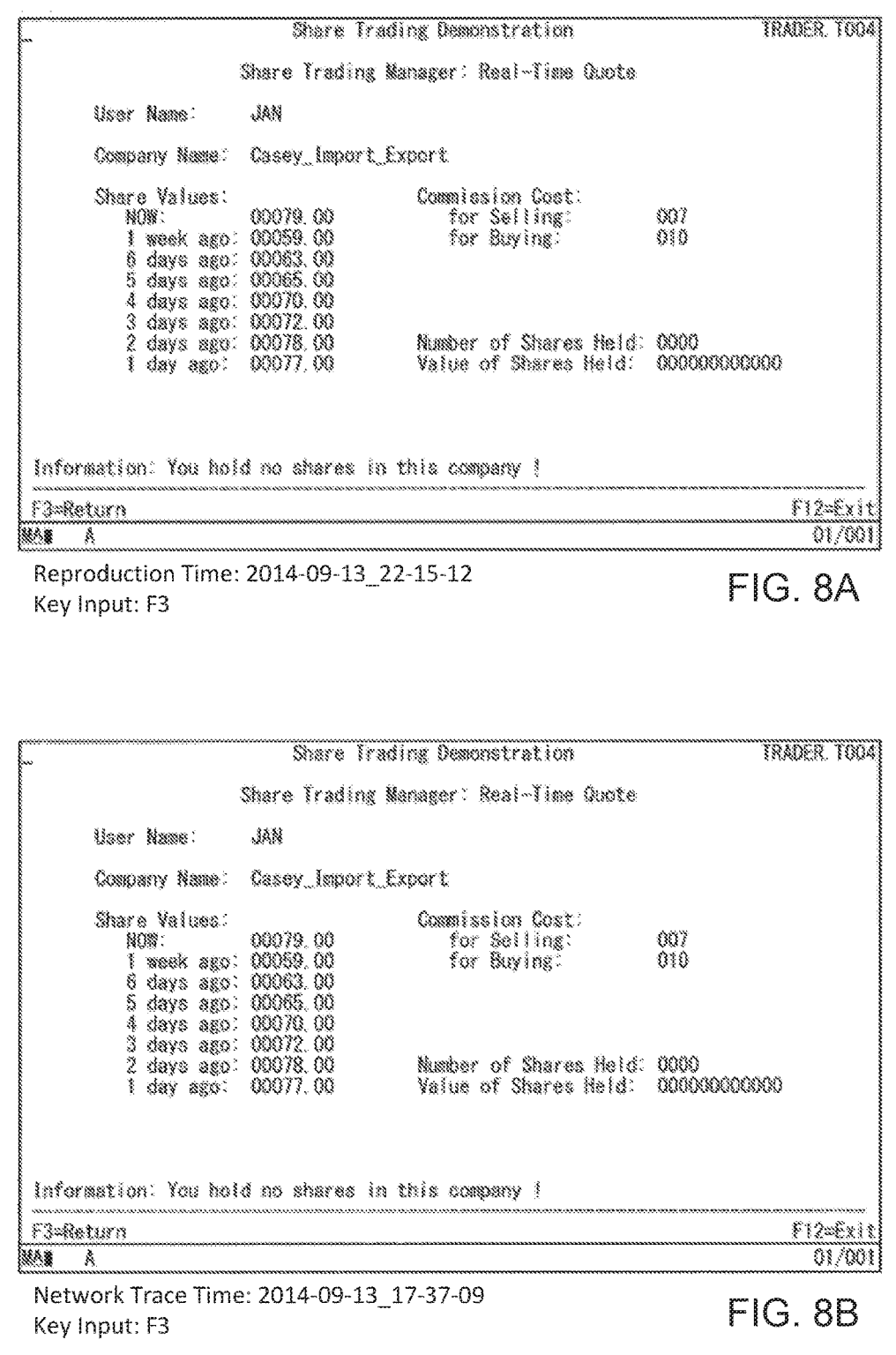

FIG. 8 is a pair of diagrams showing screens based on screen data included in the message in Sequence No. 25 of the message file 301 shown in FIG. 2. FIG. 8A is a diagram showing a screen based on screen data written to the test screen buffer 223, and FIG. 8B is a diagram showing a screen based on screen data written to the reference screen buffer 213. When the screen in FIG. 8A and the screen in FIG. 8B are compared, they are exactly the same. This means the processing related to the screen has been processed by the new host system 50 in the same way as the current host system 40.

The "replay time" shown in FIG. 8A is the time at which the message is reproduced by the manual operation replay unit 224 based on the manual operation performed in screen FIG. 8A. The "key input" in the manual operation reproduced by the manual operation replay unit 224 is the input of the "F3" key (function key). This content is the same as the "key input" content in FIG. 8B described below. This input content is replayed by the manual operation replay unit 224 on the basis of the message in Sequence No. 07 of the scenario file 201 shown in FIG. 4.

The "network trace time" shown in FIG. 8B is the time traced for the message including the screen data of the screen in FIG. 8B and was recorded in message file 301. The "key input" in the manual operation actually performed on the screen displayed on the terminal 30 is input of the "F3" key (function key).

FIG. 9 is a pair of diagrams showing screens based on screen data included in the message in Sequence No. 33 of the message file 301 shown in FIG. 2. FIG. 9A is a diagram showing a screen based on screen data written to the test screen buffer 223, and FIG. 9B is a diagram showing a screen based on screen data written to the reference screen buffer 213. When the screen in FIG. 9A and the screen in FIG. 9B are compared, they are partially different. This means the processing related to the screen was performed by the new host system 50 in a way that was somewhat different from the current host system 40. The differences between the screen on FIG. 9A and the screen in FIG. 9B will be explained below in greater detail.

The "replay time" shown in FIG. 9A is the time at which the message is replayed by the manual operation replay unit 224 based on the manual operation performed in screen FIG. 9A. The "key input" in the manual operation replayed by the manual operation replay unit 224 is the input of the "F3" key (function key). This content is the same as the "key input" content in FIG. 9B described below. This input content is replayed by the manual operation replay unit 224 on the basis of the message in Sequence No. 11 of the scenario file 201 shown in FIG. 4.

The "network trace time" shown in FIG. 9B is the time traced for the message including the screen data of the screen in FIG. 9B and was recorded in message file 301. The "key input" in the manual operation actually performed on the screen displayed on the terminal 30 is input of the "F3" key (function key).

The following is an explanation of the differences on the screens in FIG. 9A and FIG. 9B. In the "Number of Shares Held:" location in FIG. 9A and FIG. 9B, the value in FIG. 9A is "0010" and the value in FIG. 9B is "0100", which is not the same. In the "Value of Shares Held:" location in FIG. 9A and FIG. 9B, the value in FIG. 9A is "000000790.00" and the value in FIG. 9B is "000007900.00", which is not the same. Therefore, the comparison unit 225 in the test execution server 200 shown in FIG. 3, when comparing the screen data on the screens in FIG. 9A and FIG. 9B, outputs a comparison result indicating that the new host system 50 performed the operations differently from the current host system 40.

In the explanation provided above, the screens were compared in a manner that was easy to understand visually. However, because character-based screens were used in the present embodiment, the comparison unit 225 does not have to compare screens displayed in an actual display unit. Instead, it may compare the screen data used to display the screens. This refers to the screen data for the screens in FIG. 9A and FIG. 9B.

Figure 10:
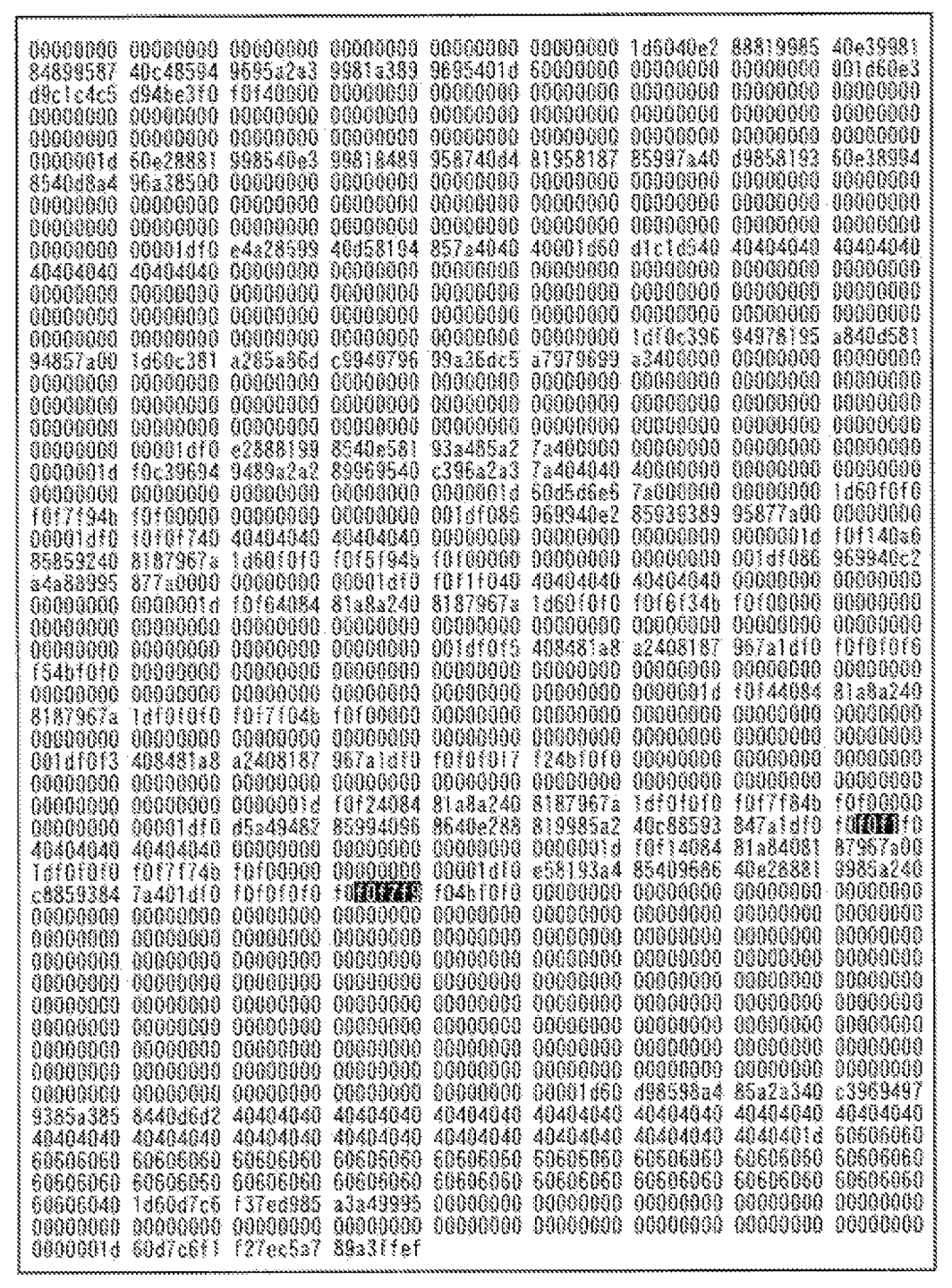
Figure 11:
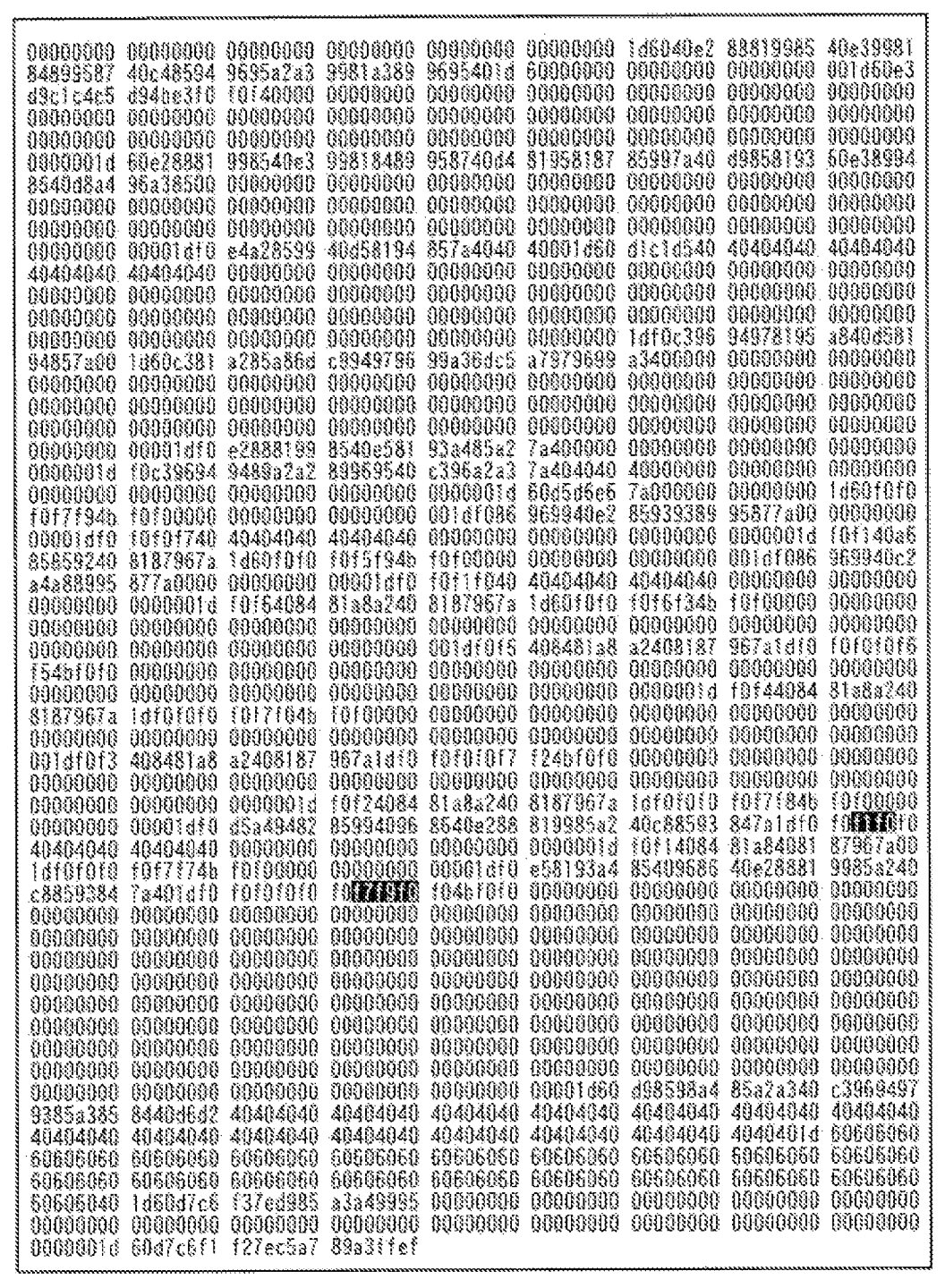

FIG. 10 is a diagram showing the screen data from the screen in FIG. 9A, and FIG. 11 is a diagram showing the screen data from the screen in FIG. 9B. When the screen data in FIG. 10 is compared to the screen data in FIG. 11, the values at two locations in the inverted display are different. In other words, location of data "f0f1" in FIG. 10 includes data "f1f0" in FIG. 11. Also, location of data "f0f7f9" in FIG. 10 includes data "f7f9f0" in FIG. 11. Therefore, the comparison unit 225 compares the screen data and outputs a comparison result indicating that there is no match.

Figure 12:
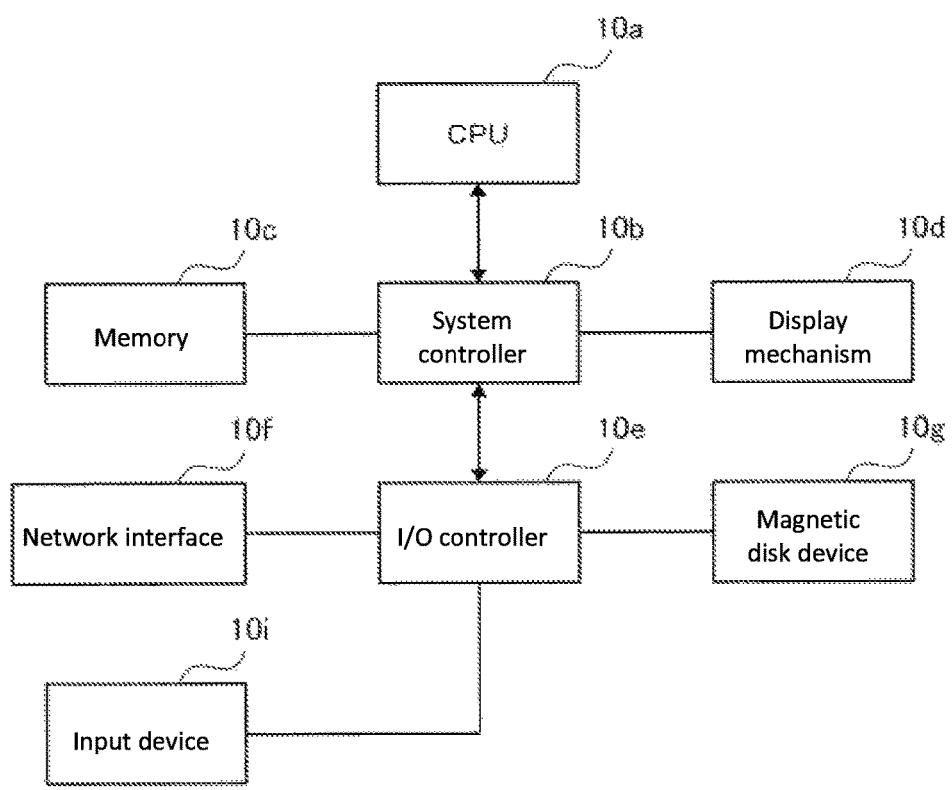
FIG. 12 is a diagram showing an example of a hardware configuration suitable for use constructing a test execution server of the present embodiment.

FIG. 12 is a diagram showing an example of a hardware configuration suitable for use constructing a test execution server 200 of the present embodiment. In the explanation, the server is configured using a computer. The computer shown in FIG. 12 has a central processing unit (CPU) 10*a* serving as the computing means, and memory 10*c* serving as the main memory means. The external devices include a magnetic disk device (HDD: hard disk drive) 10*g*, a network interface 10*f*, a display mechanism 10*d* including a display unit, and input devices 10*i* such as a keyboard and mouse.

In the example shown in FIG. 12, the memory 10*c* and display mechanism 10*d* are connected to the CPU 10*a* via a system controller 10*b*. The network interface 10*f*, the magnetic disk device 10*g*, and the input devices 10*i* are connected to the system controller 10*b* via an I/O controller 10*e*. These configuration elements are connected via various types of buses such as system buses and I/O buses.

In FIG. 12, the OS program and application programs are stored on the magnetic disk device 10*g*. By retrieving these programs from the memory 10*c* and running them on the CPU 10*a*, the various functions of the host message replay unit 211, the terminal message replay unit 212, the terminal agent 221, the automatic response unit 222, the manual operation replay unit 224, and the comparison unit 225 in the test execution server 200 can be realized. The reference screen buffer 213 and the test screen buffer 223 are realized by the memory 10*c* and the magnetic disk device 10*g*. The scenario files 201 are also held by the memory 10*c* and the magnetic disk device 10*g*. FIG. 12 merely shows an example of a computer hardware configuration that is suitable for realizing the test execution server 200 in the present embodiment. The specific configuration of the test running server 200 is not limited to the configuration shown in FIG. 12.

An embodiment of the present invention was explained above, but the test system 10 in the embodiment is not restricted to the particular configuration described above. For example, the functions of the test execution server 200 may be installed in separate servers, one having the host message replaying unit 211, terminal message replaying unit 212, and the comparison screen buffer 213 for replaying the operations of the terminal 30 and the current host system 40, and another having the terminal agent 221, the automatic response unit 222, the test screen buffer 223, the manual operation replay unit 224, and the comparison unit 225 for testing the operations of the new host system 50.

In the present embodiment, the timing for sending messages generated by the manual operation replay unit 224 on the basis of manual operations was controlled in accordance with timing conditions determined on the basis of the actual exchange of messages between the terminal 30 and the current host system 40. By observing the actual amount of elapsed time in the replay, the load per unit of time is the same as that recorded in the message file 301. This takes into account the configuration of the information system connecting the terminals to the host system, and tests non-functional requirements such as the load and stability of the host system in addition to testing the functional requirements of the host system. In a situation in which it is good to test only the functional requirements of the host system, an upper limit may be set for the time conditions (for example, five seconds), and the message sending timing may be controlled so as not to exceed the predetermined upper limit of the time.

In the present embodiment, the manual operation replay unit 224 compares screen data written to the test screen buffer 223 and screen data registered in the scenario file 201 in order to ensure that the processing performed just prior is completed before the messages are sent. However, screen data does not have to be compared. Instead, the total length of the message received by the terminal agent 221 from the new host system 50 after a message has been sent by a prior manual operation can be compared to the total length of the corresponding message registered in the message file 301. If the lengths are the same, it is determined that the prior processing has been completed. This method is less precise than the comparison of screen data, but it is simple to install and reduces the workload on the test execution server 200.

In the present embodiment, when a message is sent by the terminal agent 221 on the basis of a manual operation, and the message received from the new host system 50 just prior requires a response, the message sent on the basis of the manual operation is sent after a message has been sent on the basis of an automatic response. However, the terminal agent 221 does not have to identify any messages received just prior from the new host system 50. It may simply send the acquired message after a predetermined amount of time has elapsed (usually the time required to make an automatic response) after acquiring a message from the manual operation replay unit 224. In the present embodiment, the information system that was verified used a character-based user interface. However, the test system 10 of the present embodiment may also be applied to information systems using a graphical user interface. Other modifications and improvements to the embodiment are also included within the technical scope of the present invention.

The invention claimed is:

1. A device for testing the operations of a host system during a host system migration, the device comprising:
   a storage unit for holding files created by extracting messages generated by manual operations of a terminal among messages exchanged between the host system and the terminal prior to the migration;
   a sending and receiving control unit for performing an exchange of messages with the host system after the migration;
   a manual operation replay unit for replaying messages registered in files, and sending the reproduced messages via the sending and receiving control unit to the host system after the migration;
   an automatic response message generating unit for automatically generating response messages for requests, and transmitting the generated messages via the sending and receiving control unit to the host system after the migration in case messages received from the host system after the migration via the sending and receiving control unit are messages requesting a response;
   a screen data generating unit for generating screen data for a screen to be displayed on the display unit of a terminal on the basis of the messages received from the host system after the migration via the sending and receiving control unit; and
   a comparison unit for comparing the screen data generated by the screen data generating unit to the screen data generated by replaying the operations of the terminal to determine whether or not there is a match, wherein the sending and receiving control unit sends the messages replayed by the manual operation replay unit after the messages generated by the automatic response unit have been sent when messages generated by the manual operation replay unit and messages generated by the automatic response message generating unit are to be sent for messages received from the host system after the migration, wherein the manual operation replay unit sends a message to be sent after a predetermined amount of time has elapsed after a message prior to the message have been sent, the predetermined amount of time being determined on the basis of the time at which a terminal sent the message corresponding to the message to be sent during an exchange between the host system and the terminal prior to the migration, and the time at which a message generated by manual operations just prior to sending the message was sent.

2. The device according to claim 1, wherein the screen to be displayed on the display unit of a terminal on the basis of messages received from the host system is a character-based user interface.

3. The device according to claim 1, wherein the manual operation replay unit sends the message to be sent after processing just prior to sending the message has been completed.

4. The device according to claim 1, further comprising:
- a message replay unit for reproducing messages exchanged between the host system and a terminal before the migration;
- a file creating unit for creating files by extracting messages generated by manual operations on the terminal on the basis of messages replay by the message replay unit, and storing the files in the storage unit; and
- a screen data simulation generating unit for generating simulated screen data for screens to be displayed on the display unit of the terminal on the basis of messages replay by the message reproducing unit, the comparison unit comparing the screen data generated by the screen data generating unit to the screen data generated by the screen data simulation generating unit to determine whether or not there is a match.

5. A device for testing the operations of a host system during a host system migration, the device comprising:
- a message replay unit for replaying messages exchanged between the host system and a terminal prior to the migration;
- a file creating unit for creating files by extracting messages generated by manual operations in the terminal on the basis of messages replayed by the message reproducing unit;
- a screen data simulation generating unit for generating simulated screen data for screens to be displayed on the display unit of the terminal on the basis of messages replayed by the message replay unit;
- a sending and receiving control unit for performing an exchange of messages with the host system after the migration;
- a manual operation replay unit for replaying messages registered in files created by the file creating unit, and sending the replayed messages via the sending and receiving control unit to the host system after the migration;
- an automatic response message generating unit for automatically generating response messages for requests, and transmitting the generated messages via the sending and receiving control unit to the host system after the migration in case messages received from the host system after the migration via the sending and receiving control unit are messages requesting a response;
- a screen data generating unit for generating screen data for a screen to be displayed on the display unit of a terminal on the basis of the messages received from the host system after the migration via the sending and receiving control unit; and
- a comparison unit for comparing the screen data generated by the screen data generating unit to screen data generated by replaying the operations of the terminal to determine whether or not there is a match;
- the manual operation replay unit sending a message to be sent after a predetermined amount of time has elapsed after other messages prior to the message have been sent, the predetermined amount of time being determined on the basis of the time at which a terminal sent the message corresponding to the message to be sent during an exchange between the host system and the terminal prior to the migration, and the time at which a message generated by manual operations just prior to sending the message was sent, and after processing just prior to sending the message has been completed; and
- the sending and receiving control unit sending the messages replayed by the manual operation replay unit after the messages generated by the automatic response generating unit have been sent when messages generated by the manual operation replay unit and messages generated by the automatic response message generating unit have been sent for messages received from the host system after the migration.

* * * * *